United States Patent [15] 3,652,822
Nakamura [45] Mar. 28, 1972

[54] ELECTRODE HOLDER FOR CONTINUOUS SUBMERGED SELF-ARC WELDING

[72] Inventor: Hajime Nakamura, Tokyo, Japan
[73] Assignee: Ishikawajima-Harima Jukogyo Kabushiki Kaisha, Tokyo, Japan
[22] Filed: June 18, 1970
[21] Appl. No.: 47,442

[30] Foreign Application Priority Data

June 24, 1969 Japan..................................44/49805

[52] U.S. Cl.............................................219/130, 219/73
[51] Int. Cl.............................................................B23k 9/18
[58] Field of Search............................................219/136, 138

[56] References Cited

UNITED STATES PATENTS 3,264,447   8/1966   Agnew..................................219/130

Primary Examiner—J. V. Truhe
Assistant Examiner—J. G. Smith
Attorney—Nolte & Nolte

[57] ABSTRACT

A contact member holder for continuous submerged self-arc welding in which the contact member is movably mounted so as to press against a welding electrode when extended and to move away from the welding electrode when a trigger wire positioned forwardly of the electrode is burnt out by the welding heat.

4 Claims, 10 Drawing Figures

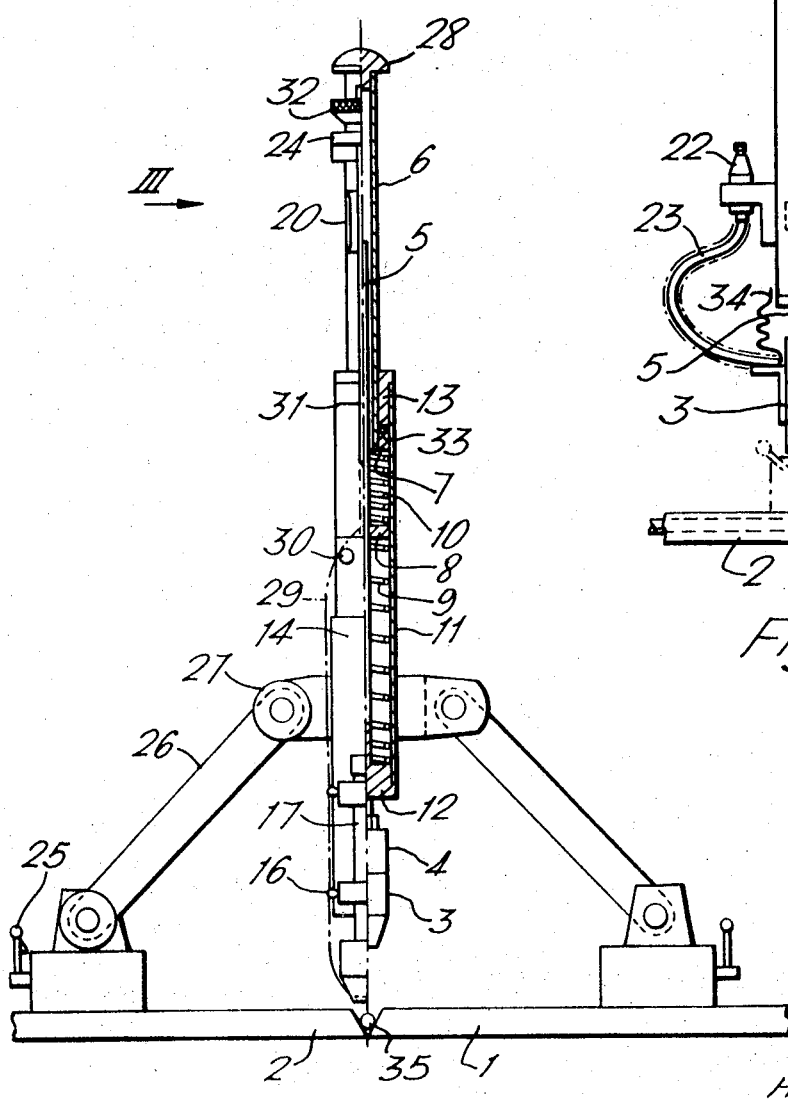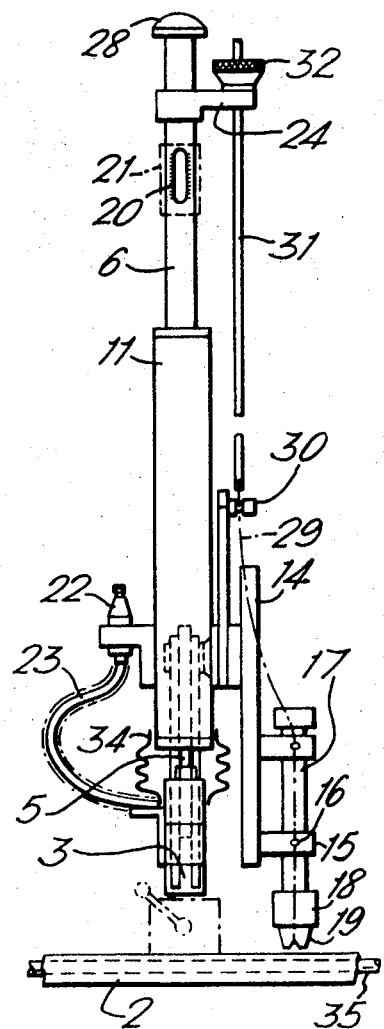

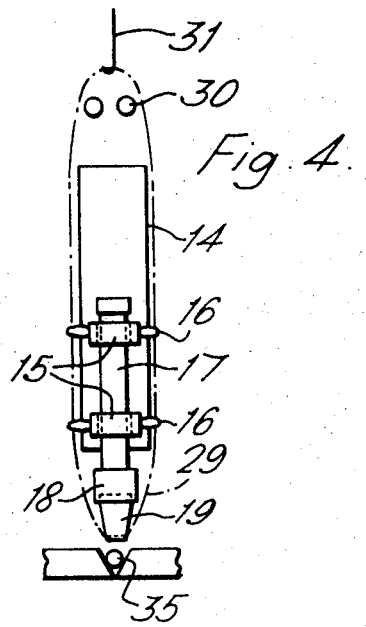
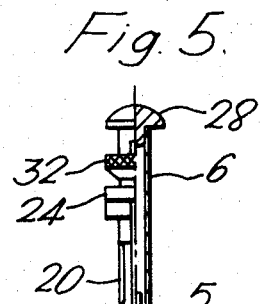

ELECTRODE HOLDER FOR CONTINUOUS SUBMERGED SELF-ARC WELDING

The present invention provides a contact member holder used in a continuous submerged self-arc welding process of the type in which a bar metal welding electrode is arranged along the weld line in spaced apart relation with the metal pieces being joined, through a plurality of electrically insulating spacers fitted over the welding electrode and spaced apart from each other in the axial direction of said welding electrode, thereby stabilizing the welding arc formed between the welding electrode and the metal pieces being joined; thereafter the welding electrode is applied with a flux for a submerged-arc welding; and the welding current is fed into the welding electrode thereby forming the welding arc from one end thereof and continuously carrying the welding along the welding electrode without extinguishing the welding arc.

The present invention relates to a portable contact member holder for applying the pressure to the welding electrode so as to maintain the spacing between the welding electrode and the metal pieces being joined at a desired distance and for feeding the welding current into the welding electrode.

A portable electrode holder for a continuous submerged self-arc welding process in accordance with the present invention is characterized in that a main body which is detachably mounted upon the metal pieces being joined and carries a contact member movably, is provided with a mechanism for extending said electrode so as to forcibly contact a welding electrode and a mechanism which is fixed to the front side of said main body and has a trigger wire which is located forwardly of said contact member in the welding direction so as to be burnt out by the welding heat, whereby said contact member is moved away from said welding electrode in response to said burnout of said trigger wire.

The present invention will be described in more detail hereinafter with reference to the accompanying drawings.

FIGS. 1(A), (B), (C) and (D) are for explanation of a continuous submerged self-arc welding process in which a contact member holder of the present invention is employed;

FIG. 2 is a front view, partly in section, of an a contact member holder in accordance with the present invention;

FIG. 3 is a side view looking in the direction indicated by the arrow III in FIG. 2;

FIG. 4 is a front view of a mechanism for releasing a contact member shown in FIGS. 2 and 3;

FIG. 5 is a front view, partly in section, of another embodiment of a contact member holder in accordance with the present invention;

Figure 7:
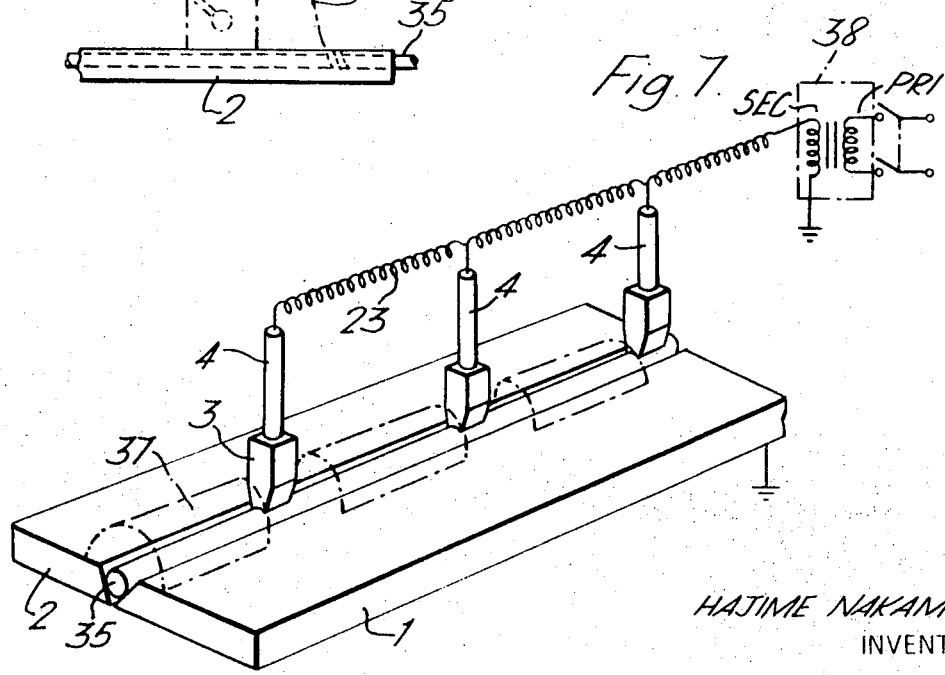
FIG. 7 illustrates the contact member holders of the present invention arranged along the weld line.

FIGS. 2, 3 and 4 illustrate one embodiment of the present invention. A cylinder 11 is vertically supported by supporting arms 26 extending from magnet bases 25 and locking nuts 27. A pair of upper and lower pistons 7 and 8 are inserted into the cylinder 11 and a spring 10 is interposed between the lower end of the upper piston 7 and the upper end of the lower piston 8. A return spring 9 is interposed between the lower piston 8 and a lower bearing 12 fixed to the lower end of the cylinder 11. To the upper piston 7 is securely fixed a pressure control hollow rod 6 having a knob 28 fixed to the upper end thereof and a pressure indicating scale 20 covered with a transparent window 21 made of an acrylic resin. By depression of the knob 28, the pressure control rod 6 is caused to move downwardly through an upper bearing 13 fixed to the upper end of the cylinder 11 so that the upper piston 7 is moved downwardly against the compression spring 10. A contact member 3 for feeding a welding current to welding electrode 35 is securely fixed through an insulator 4 to compression rod 5 which in turn is securely fixed to the lower end of the lower piston 8. The upper end of the compression rod 5 is extended through the control rod 6 over the pressure indicating scale 20. When the lower piston 8 is forced to move downwardly by the downward movement of the upper piston 7 which in turn is caused by the downward movement of the pressure control rod 6, the contact member 3 is caused to move downwardly through the compression rod 5. The pressure acting upon the welding electrode 35 from the contact member 3 may be read from the scale 20 as the relative displacement between the pressure control rod 6 and the compression rod 5. The contact member 3 is electrically connected to a connector 22 to a welding power source through a cable 23. A supporting member 14 is fixed to the lower, front side of the cylinder 11 in parallel therewith. A pin 30 for wrapping therearound a trigger wire 29 is disposed upwardly of the supporting member 14. A trigger hook 31 having at its upper end a pressure control screw 32 is supported through a supporting arm 24 extending from the control rod 6 so as to be in parallel with the rod 6. A pair of upper and lower trigger wire position adjustment screws 15 having a trigger wire guide 16 are fixed to the front side of the supporting member 14 in vertically spaced apart relation with each other. A trigger wire position adjustment screw or threaded rod 17 is screwed into the pair of adjustment screws 15 and a metal fitting 18 for supporting a solid flux 19 is securely fixed to the lower end of the adjustment threaded rod 17. One end of the trigger wire 29 is fixed to the lower end of the solid flux 19, passed through the trigger wire guides 16 and the pin 30 and connected to the trigger hook 31 which is caused to move downwardly simultaneously when the knob 28 is depressed. It should be noted that the control rod 6 is maintained in its lowered position because the trigger wire 29 is connected to the trigger hook 31, but when the trigger wire is burnt off the control rod 6 is permitted to move upwardly. Thus, a mechanism for releasing the contact member 3 is constituted. It is also noted that the control rod 6 may be displaced upwardly or downwardly by rotating the control screw 32 even when the trigger wire 29 is connected to the trigger hook 31. Reference numeral 33 designates a shock absorber made of rubber for absorbing the shock of the control rod 6 when it is returned upwardly to its initial position when the trigger hook 31 is released because the trigger wire 29 is burnt out during the welding. A bellows 34 is interposed between the lower end of the cylinder 11 and the insulator 4 for protecting this portion from the dust or the like. In FIG. 1, 35, designates an electrode; 36, a spacer for electrically insulating the electrode 35 from the metal pieces 1 and 2 being joined; and 37, a flux. In FIG. 7, 38 designates a welding power source to which is connected the electrode holder through the connector 22.

Figure 1A:
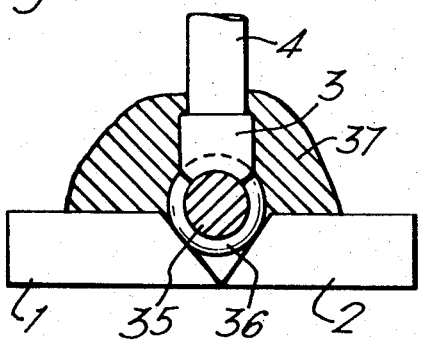
Figure 1B:
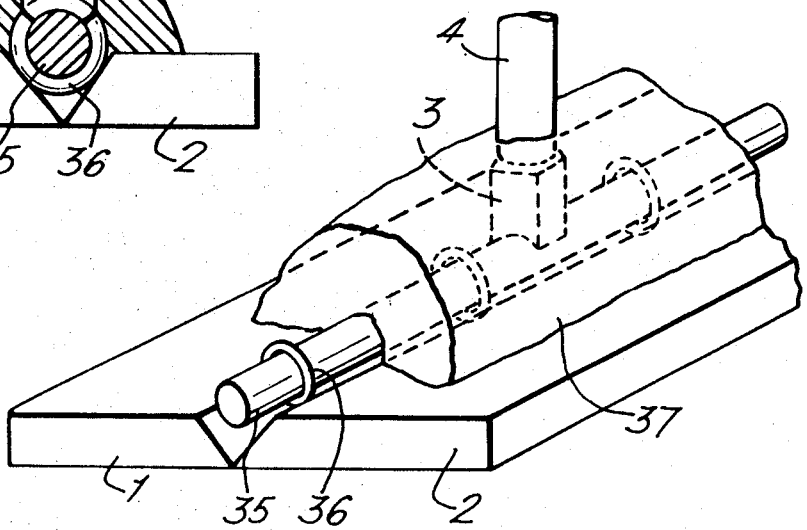
Figure 1C:
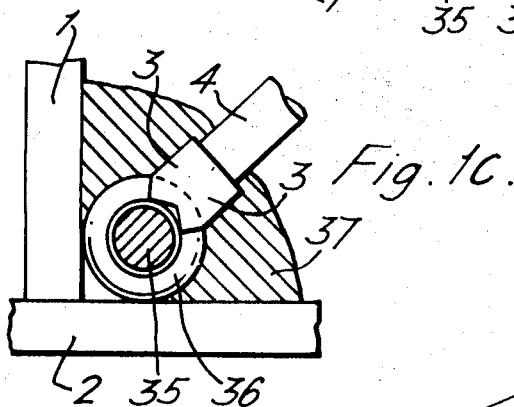
Figure 1D:
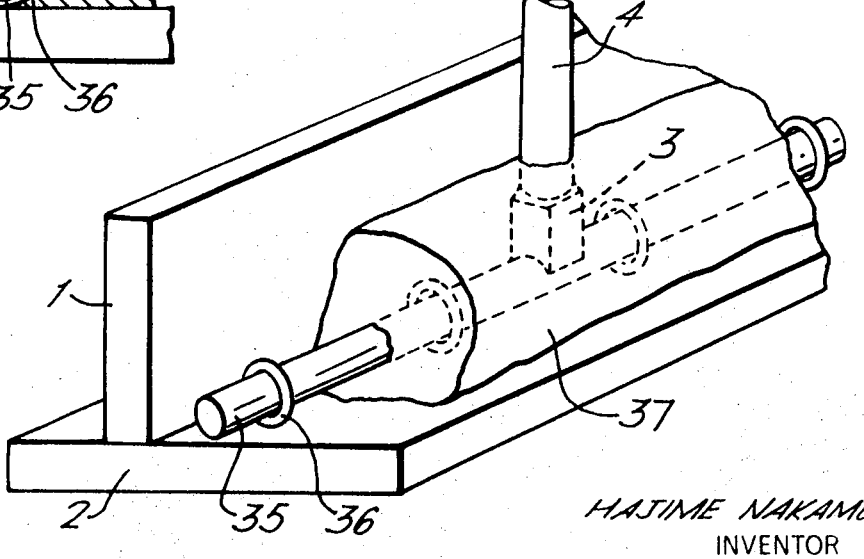

The portable electrode holder of the present invention is employed in continuous submerged self-arc welding. Such welding process is illustrated in FIG. 1. That is, in case of welding a butt joint as shown in FIGS. 1(A) and (B) and in case of a horizontal fillet welding as shown in FIGS. 1(C) and (D), the electrode 35 is placed along a weld line in an electrically insulated relation with the metal pieces 1 and 2 being joined, through the spacers 36 which are fitted over the electrode 35 and spaced apart from each other by a suitable distance in the axial direction of the electrode 35. The welding electrode 35 is then blanketed with the flux 37. In this process, the electrode holder serves to press the electrode 35 against the metal pieces 1 and 2 being joined through the spacers 36 so as to hold the electrode 35 in predetermined position and also to feed the welding current into the electrode 35.

This will be described in more detail hereinafter. After the electrode 35 is placed in position as described hereinabove, the holders of the present invention are arranged along the weld line upon the metal pieces 1 and 2 being joined in a suitably spaced apart relation with each other. The angular position of the contact member 3 may be suitably adjusted by moving the arms 26. Thereafter, the locking nuts 27 are tightened so that the contact member 3 is held in desired position. It is seen that in case of welding a butt joint the contact member holder of the present invention is arranged as shown in FIGS. 2 and 3, while in case of a horizontal fillet welding, the angular position of the contact member 3 is adjusted as shown in FIG. 1(C).

The trigger wire 29 plays a very important role for releasing the contact member 3 from the welding electrode 35 during the welding. As described hereinabove, the trigger wire 29 is engaged with the end of the solid flux 19, passed through the guides 16 and the pin 30 and connected to the trigger hook 31 which is moved down by the depression of the knob 28. By rotating the threaded rod 17, the lower end of the solid flux 19 is made in contact with the electrode 35 about 50 mm. forwardly of the feeding point, that is the point where the contact member 3 is in contact with the welding electrode 35. Upon depression of the knob 28, the control rod 6 is caused to move down in unison with the upper piston 7 so that the lower piston 8 as well as the compression rod 5 are moved downwardly through the compression spring 10, whereby the return spring 9 is compressed while the contact member 3 is forced downwardly. In this case, the contact member 3 is put into in contact with the welding electrode 35 or is caused to approach the electrode 35 so as to be almost made in contact with the welding electrode 35.

Since the trigger wire 29 is connected to the trigger hook 31, the latter is retained by the pin 30. Next the knob 28 is released so that the trigger hook 31 tends to move upwardly under the force of the spring, but this upward movement is prevented by the trigger wire 29 connected to the trigger hook 31. More specifically, the upward movement of the trigger hook 31 is only permitted a distance corresponding to the slack of the trigger wire 29. Therefore, the trigger wire 29 is tightened between the pin 30 and the trigger hook 31 so that the control rod 6 as well as the compression rod 5 are maintained in their lowered positions.

Next the gap between the contact member 3 and the electrode 35 caused by the above-described limited upward movement of the trigger hook 31 may be adjusted so that the contact member 3 may press the welding electrode 35 against the metal pieces 1 and 2 through the spacers 36, but in spaced apart relation with the metal pieces 1 and 2 in the following manner.

The adjustment screw 32 is tightened so that the control rod 6 is lowered, thereby lowering the contact member 3 so as to contact the welding electrode 35. In order to apply the force to the electrode 35, the adjustment screw 32 is further tightened, but only the spring 10 is compressed. Since the compression of the spring 10 is proportional to the contacting force between the contact member 3 and the electrode 35, the compression force of the contact member 3 acting upon the welding electrode 35 may be indicated. The reading of the compression force may be made through the window 21 from the scale 20. That is, the relative displacement between the control rod 6 and the compression rod 5 from the reference point at which the contact member 3 is placed in contact with the electrode 35 may be read out. From this reading, the compression force may be suitably adjusted. In the similar manner as described hereinabove, all of the electrode holders may be adjusted. When the compression force of the electrode 3 acting upon the welding contact member 35 is adjusted as described above and when the solid flux 19 is precisely positioned relative to the electrode 35, the cable 23 from the power source 38 is connected to the connector 22 of the electrode holder. Thereafter, the flux for submerged-arc welding is applied to the bar metal electrode 35 to a suitable depth, whereby the electrode 35 is submerged in the flux.

The welding current is fed into the bar metal electrode 35 from the contact member 3 and the welding arc is formed, whereby the submerged self-arc welding is started. When the welding arc approaches the electrode holder, the trigger wire 29 is burnt out by the welding heat so that the trigger hook 31 is released. Therefore, the contact member 3 is immediately automatically moved away from the welding electrode 35 under the returning force of the spring 9. The shock generated by the returning of the contact member 3 away from the electrode 35 may be absorbed by the shock absorber 33. When the contact member holder stops feeding the welding current into the electrode 35 in a manner as described above, the next contact member holder is immediately and automatically energized so that the feeding of the welding current into the contact member holder 35 through the contact member 3 of the next electrode holder may be continuously started without any interruption. Thus, the welding arc may be advanced without being extinguished, whereby the continuous welding is carried out. The contact member holders are sequentially and automatically energized in a manner as described above.

Figure 6:
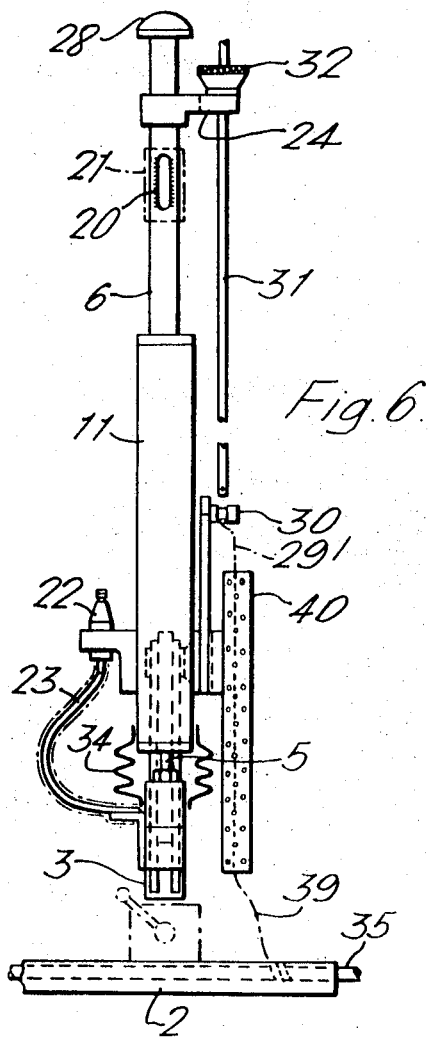
FIG. 6 is a side view thereof looking in the direction indicated by the arrow VI in FIG. 5.

FIGS. 5 and 6 show another embodiment of the present invention. In this embodiment, instead of the contact member releasing device of the first embodiment, a fuse 39 which is ignited by the welding heat is employed. A combustion pipe 40 is fixed to the lower front side of the cylinder 11 in parallel therewith. The trigger wire 29' one end of which is connected to the upper end of the fuse 39 is wrapped around the pin 30 and the other end of the trigger wire 29' is fixed to the lower end of the trigger hook 31 which is lowered by the depression of the knob 28 as in the case of the first embodiment. Therefore, the control rod 6 may be maintained in its lowered position. The lower end of the fuse 39 is placed in contact with the electrode 35 about 50 mm. ahead of the feeding point at which the contact member 3 contacts with the electrode 35. When the fuse 39 is ignited by the welding heat, it burns rapidly through the combustion pipe 40 so that the trigger wire 29' is burnt out. Therefore, the trigger hook 31 is released so that the contact member 3 is immediately and automatically moved away from the welding electrode 35 in a similar manner as described with reference to the first embodiment.

In this invention, the circuit on the secondary side is charged with welding voltage by closing the primary side of the transformer in FIG. 7, and an electric arc arises when an appropriate material for ignition is brought closer to the starting edge of the welding electrode 35. Thus an automatic welding is started in the state of complete submerged-arc. The supply of electricity to the welding electrode is performed in the earlier stage at the contact member situated closer to the starting edge.

When the structual parts of the contact member holder of the present invention are made of a light metal, it will become more portable. An oxygen generating agent may be added in the trigger wire and the fuse 39 so that they may burn even in the flux where the supply of oxygen is limited. Preferably the burning rate of the fuse 39 is constant and a special coating may be applied to the fuse so that it will be free from moisture pick-up when it is left in the atmosphere. When the trigger wire 29 is used, it is sufficient that only the portion of the trigger wire at the end of the solid flux 19 is burnt out. But when the trigger wire 29' is connected to the fuse 39, it is preferable that the trigger wire 29' is made of the same materials as the fuse 39 so that the trigger wire 29' may be burnt out completely. More preferably, the trigger wire 29' may be made of fiber having a higher tensible strength.

It is to be understood that variations and modifications can be effected without departing the true spirit of the present invention.

From the foregoing, it is seen that the construction of the portable contact member holder of the present invention is such that the contact member is movably fixed so as to apply the force to the welding electrode when extended and the contact member may be moved away from the welding electrode when the trigger wire positioned forwardly of the contact member is burnt out by the welding heat. Therefore, the welding may be done automatically. Since the contact member is immediately moved away from the welding electrode in response to the burnout of the trigger wire positioned ahead of the electrode, the welding operation is not interrupted at all. As compared with the system for triggering in response to the heat detected at the welding arc point, the present invention is inexpensive, simple in operation and free from breakdown. Furthermore, the operation is reliable. The contact member holder of the present invention is simple in construction and can prevent erratic operations.

The present invention fundamentally solved the problems of the interruption of welding, the correction of the defects in welding, etc. The present invention has many further advantages.

What is claimed is:

1. A portable contact member holder for continuous submerged self-arc welding, comprising a main body, means for detachably mounting the main body upon metal pieces being joined, a contact member movably mounted on the main body, means for extending the contact member into contact and withdrawing the contact member from contact with a welding electrode, retaining means operatively connected to the contact member extending and withdrawing means, when the contact is in an extended position in contact with the welding electrode, for preventing actuation of the extending and withdrawing means to withdraw the contact member from contact with the welding electrode and permitting actuation of the extending and withdrawing means to withdraw the contact member from contact with the welding electrode when the connection is broken, the retaining means including a trigger wire and being combustible at least in part, at least the combustible part of the retaining means being spaced from the main body in the direction of welding so as to be combusted by the welding heat, whereby the connection to the contact member is broken and the contact member is withdrawn from the welding electrode.

2. A portable contact member holder according to claim 1, in which the combustible part comprises the trigger wire.

3. A portable contact member holder according to claim 1, in which the combustible part comprises a fuse.

4. A portable contact member holder according to claim 1, in which the extending and withdrawing means comprises a cylinder, a first piston reciprocably mounted in the cylinder, the contact member being connected to the first piston in spaced relation from one end of the cylinder, a second piston reciprocably mounted in the cylinder, a member connected to the second piston and axially projecting from the other end of the cylinder, a first compression spring having opposed ends respectively biased against the first and second pistons, abutment means at said one end of the cylinder, a second compression spring having opposed ends respectively biased against the abutment means and the first piston, the retaining means being connected to said axially projecting member and holding the pistons against the opposition of the compression springs until said combustible part is combusted by the welding heat.

* * * * *